US010841465B1

(12) United States Patent
Dvorsky

(10) Patent No.: US 10,841,465 B1
(45) Date of Patent: Nov. 17, 2020

(54) SELF LEVELING CAMERA HEADS WITH INDUCTIVE AND CAPACITIVE COUPLING

(71) Applicant: Ridge Tool Company, Elyria, OH (US)

(72) Inventor: James Dvorsky, Plain City, OH (US)

(73) Assignee: Ridge Tool Company, Elyria, OH (US)

( * ) Notice: Subject to any disclaimer, the term of this patent is extended or adjusted under 35 U.S.C. 154(b) by 0 days.

(21) Appl. No.: 16/552,139

(22) Filed: Aug. 27, 2019

Related U.S. Application Data

(60) Provisional application No. 62/788,173, filed on Jan. 4, 2019.

(51) Int. Cl.
*H04N 5/225* (2006.01)
*G01N 21/88* (2006.01)

(52) U.S. Cl.
CPC ....... *H04N 5/2252* (2013.01); *G01N 21/8803* (2013.01); *H04N 5/2253* (2013.01); *H04N 5/2254* (2013.01); *H04N 5/2256* (2013.01); *H04N 5/2257* (2013.01); *H04N 5/2259* (2013.01); *H04N 2005/2255* (2013.01)

(58) Field of Classification Search
CPC .. H04N 5/2252; H04N 5/2254; H04N 5/2256; H04N 5/2253; H04N 5/2259; H04N 5/2257; H04N 2005/2255; G01N 21/8803
See application file for complete search history.

(56) References Cited

U.S. PATENT DOCUMENTS

| | | | | |
|---|---|---|---|---|
| 2002/0131781 A1* | 9/2002 | Buck | ..................... | H04N 5/2252 396/419 |
| 2005/0275725 A1* | 12/2005 | Olsson | ................. | G03B 37/005 348/207.99 |
| 2014/0176696 A1* | 6/2014 | Chapman | ............. | G03B 37/005 348/84 |
| 2015/0263469 A1* | 9/2015 | Olsson | ................. | H04N 5/2254 348/82 |
| 2017/0140869 A1* | 5/2017 | Costanzo | ................. | H01F 7/004 |
| 2019/0089933 A1* | 3/2019 | Olsson | ................... | G01D 11/30 |
| 2019/0141296 A1* | 5/2019 | Olsson | ................. | H04N 5/2253 |
| 2020/0088653 A1* | 3/2020 | Martin | ................. | G01N 21/954 |
| 2020/0173602 A1* | 6/2020 | Olsson | ................. | H04N 5/2355 |

OTHER PUBLICATIONS

Lisa Eitel, Standard versus custom slip rings—and inductive, capacitive, wetted mercury variations, Dec. 23, 2018, Motion control tips, https://www.motioncontroltips.com/standard-versus-custom-slip-rings-and-inductive-capacitive-wetted-mercury-variations/ (Year: 2018).*

* cited by examiner

*Primary Examiner* — Francis Geroleo
(74) *Attorney, Agent, or Firm* — Mark E. Bandy; Rankin, Hill & Clark LLP

(57) ABSTRACT

Self leveling camera heads are described. The camera heads can be used in a range of applications including drain inspection systems. The camera heads include inductive and capacitive coupling to transfer signals from and electrical power to an image sensor assembly in the camera head. Also described are drain inspection systems using the camera heads.

22 Claims, 8 Drawing Sheets

SELF LEVELING CAMERA HEADS WITH INDUCTIVE AND CAPACITIVE COUPLING

FIELD

The present subject matter relates to camera heads used in inspection systems such as drain inspection systems. The present subject matter also relates to inspection systems using the noted camera heads.

BACKGROUND

At present, the RIDGID brand is the market leader for drain inspection systems including cameras, monitors, push rods (also referred to as push cables), reels and related accessories. RIDGID's camera systems are used by contractors daily. Users value the durability and reliability of these systems. Self leveling camera heads and related push rods available under the RIDGID designation are known to withstand rough handling and extreme conditions typically encountered on jobsites and are considered to exhibit superior quality when compared to competing products.

Self leveling (SL) camera heads typically accomplish image rotation by aligning a video image with the vector of gravity. This is achieved by mechanically rotating an image sensor and camera lens which are mounted on a weighted rotatable shaft within the camera head. The signal and power for the camera components are transmitted through slip rings and sliding electrical contacts to a connector in the camera head.

Although RIDGID cameras are known in the industry as very rugged, the slip rings for power transmission to, and signal transmission from, the rotating camera sensor may potentially experience reliability issues. Accordingly, a need exists for a self leveling camera head that avoids such issues, and particularly which can withstand the extreme conditions typically encountered during drain inspection.

SUMMARY

The difficulties and drawbacks associated with previous approaches are addressed in the present subject matter as follows.

In one aspect, the present subject matter provides a camera head comprising a housing, an image sensor assembly disposed in the housing, a first portion of a capacitive coupling electrically connected to the image sensor assembly, a second portion of a capacitive coupling in wireless signal communication with the first portion of the capacitive coupling, a first portion of an inductive coupling electrically connected to the image sensor assembly, and a second portion of an inductive coupling in wireless power transmission with the first portion of the inductive coupling.

In another aspect, the present subject matter provides a self leveling camera head comprising an enclosure defining a hollow interior, a rear portion of an inductive coupling supported by the enclosure, an outer portion of a capacitive coupling supported by the enclosure, a primary electronic assembly supported by the enclosure, and a rotatable assembly disposed in the hollow interior of the enclosure. The rotatable assembly includes an inner portion of a capacitive coupling, an image sensor assembly, and a front portion of an inductive coupling. The outer portion of the capacitive coupling and the inner portion of the capacitive coupling are in wireless signal communication with each other. And the front portion of the inductive coupling and the rear portion of the inductive coupling are in wireless power transmission with each other.

In another aspect, the present subject matter provides an inspection system comprising an operator interface, a reel assembly including a rotatable drum, a camera head, and a push cable extending between the reel assembly and the camera head. The camera head includes (i) a housing, (ii) an image sensor assembly disposed in the housing, (iii) an inner portion of a capacitive coupling electrically connected to the image sensor assembly, (iv) an outer portion of a capacitive coupling in wireless signal communication with the inner portion of the capacitive coupling, (v) a front portion of an inductive coupling electrically connected to the image sensor assembly, and (vi) a rear portion of an inductive coupling in wireless power transmission with the front portion of the inductive coupling.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
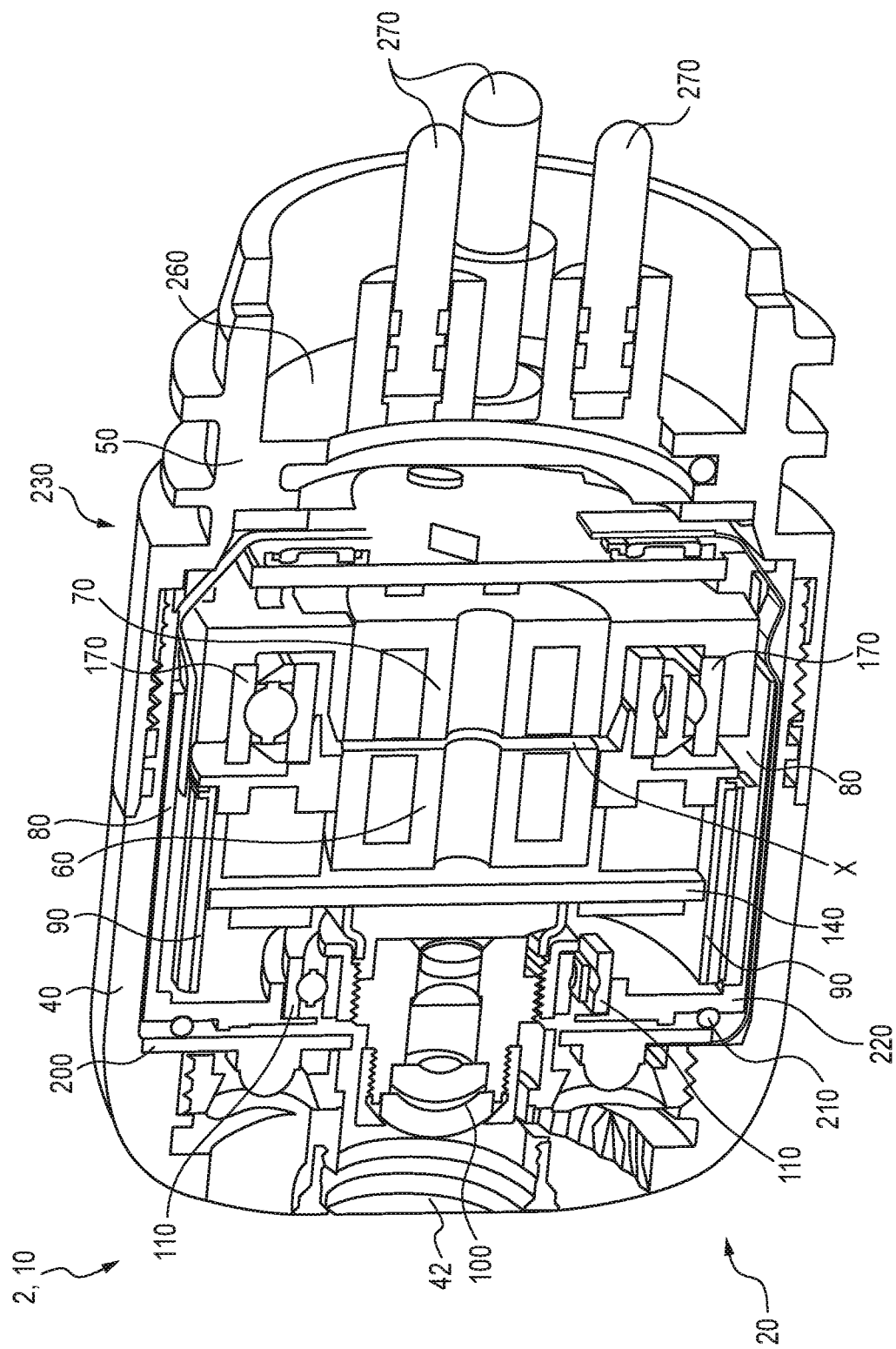
FIG. 1 is a schematic sectional view illustrating aspects of an embodiment of a camera head in accordance with the present subject matter.

The present subject matter relates to camera heads that exhibit a variety of benefits and performance features including improved reliability. The present subject matter provides a self leveling camera head that is free of slip rings or other assemblies of sliding electrical contacts, and that enables relative motion between an image sensor and a camera body while facilitating the propagation of power or video signals. And in a particular aspect, the present subject matter provides a self leveling camera head that is free of slip rings or related assemblies of sliding electrical contacts, and that enables relative motion of an image sensor disposed in the camera head to camera body while simultaneously transmitting both power and video signals between the camera and associated push rod assemblies connected to the camera.

Referring to FIGS. 1-6, an embodiment of a camera head 2 and its components, in accordance with the present subject matter is illustrated. The camera head 2 generally comprises a front housing 40 threadedly connected to a rear housing 50. The housings 40, 50 generally enclose the components of the camera head 2 as follows. The camera head 2 comprises a camera head module 10 enclosed by the housings 40, 50. It will be understood that the terms "camera head" and "camera head module" are used interchangeably herein except in instances in which the housings 40, 50 are described in association with the camera head module. The camera head 2 generally comprises a rotatable assembly 20 and a collection of components mounted within an enclosure 220. The rotatable assembly 20 can rotate relative to and within the enclosure 220 and as described in greater detail herein, rotates to align itself with gravity. Inductive and capacitive couplings in the camera head described in greater detail herein, wirelessly transfer power and video signals between the rotatable assembly 20 and a primary electronic assembly 230 disposed in the enclosure 220.

Figure 3:
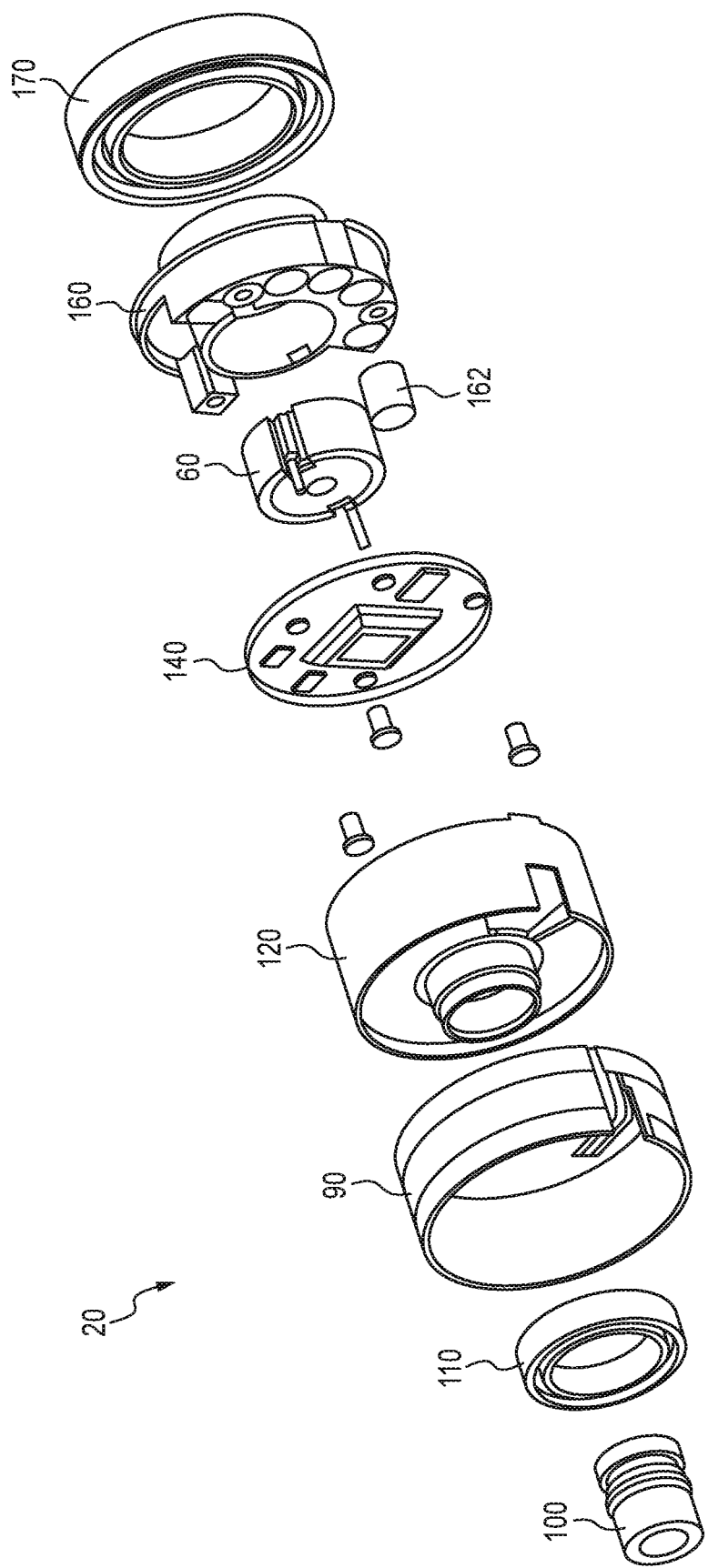
FIG. 3 is a schematic exploded assembly view of a rotating assembly of the camera head module of FIG. 2.

The rotatable assembly 20 as shown in FIG. 3, comprises an optical lens assembly 100, a front bearing assembly 110, a first or an inner capacitive coupling portion 90, an inner housing 120, an image sensor assembly 140, a first or front inductive coupling portion 60, a weighted support assembly 160, one or more weighted inserts 162, and a rear bearing assembly 170. The inner capacitive coupling portion 90 is attached to the inner housing 120 and typically supported thereon. The entire assembly 20 rotates as one independent assembly as described herein. The weighted inserts 162 provide an unbalanced load in the weighted support assembly 160 and therefore act with gravity to consistently provide alignment with the gravity vector for the image sensor assembly 140. The weighted inserts 162 typically comprise high density materials such as metals and in many versions can be formed from Tungsten. The weighted inserts 162 are attached or otherwise coupled to the weighted support assembly 160 and promote gravity alignment of the assembly 160. The image sensor assembly 140, mounted within the rotating assembly 20, provides the appropriate viewing image to the end viewing device such as one or more monitors described in conjunction with an inspection system noted herein, for example. Therefore, the rotating assembly 20 maintains its orientation relative to gravity, while the outer housing of the camera head 2 is free to rotate. As such, with the combination of capacitive coupling and inductive coupling as described herein, the need for direct contact of power delivery and electronic signal communication is not required and the system can continue to support a gravity determined self leveling camera head.

Figure 4:
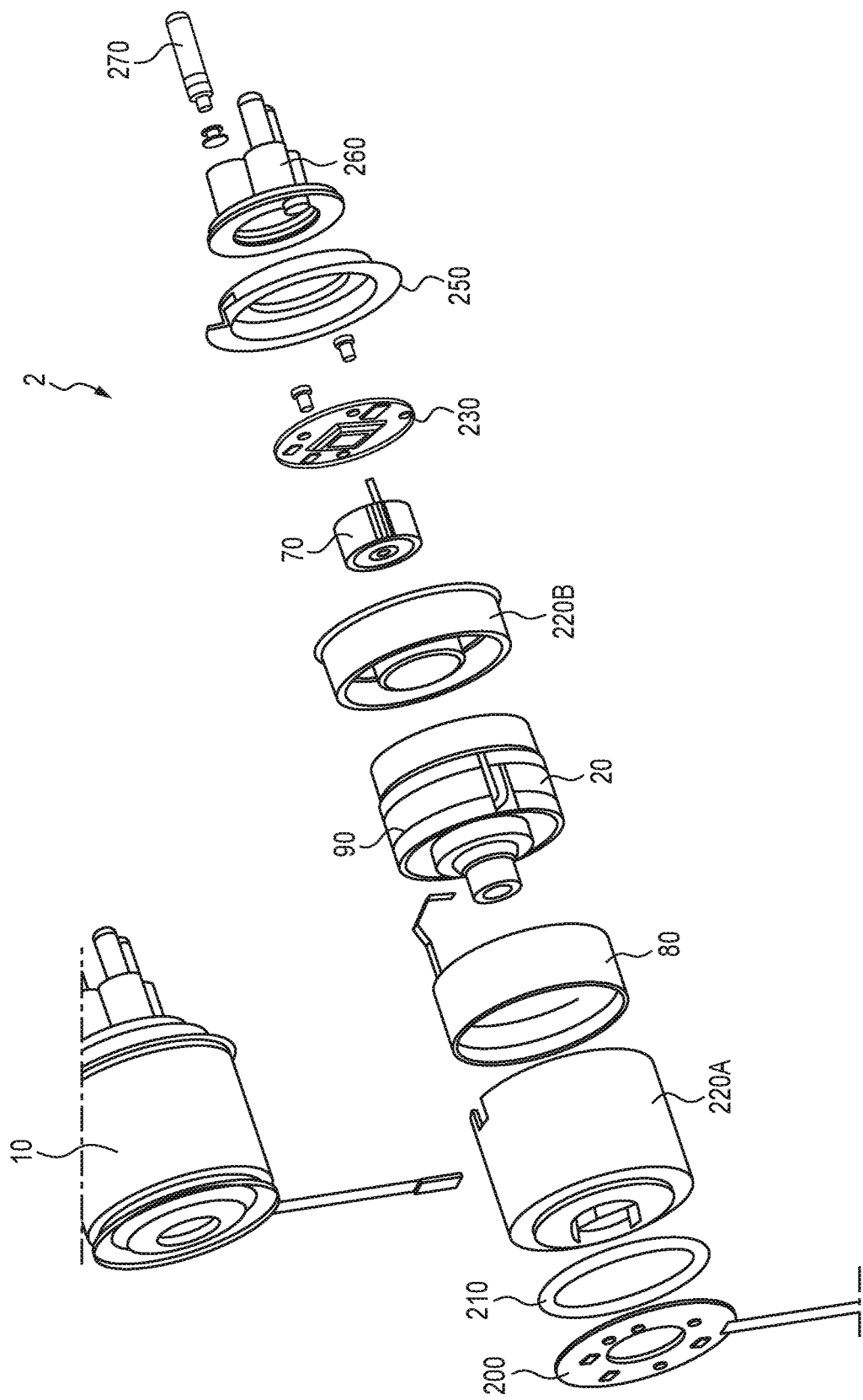
FIG. 4 is a schematic exploded assembly view of the camera head module of FIG. 2.

FIG. 4 illustrates the rotatable assembly 20 incorporated with additional components of the camera head 2. FIG. 4 also illustrates the assembled camera head module 10. The enclosure 220 can include a front enclosure 220A and a rear enclosure 220B. The enclosures 220A, 220B can be configured to engage each other and define a generally hollow interior within which the rotatable assembly 20 is disposed. Supported and affixed within the interior of the enclosure 220 is a second or an outer capacitive coupling portion 80. The rotatable assembly 20 with its inner capacitive coupling portion 90 is disposed within the outer capacitive coupling 80. Both the inner capacitive coupling portion 90 and the outer capacitive coupling portion 80 are thin members having cylindrical shapes. The inner capacitive coupling portion 90 is spaced from, and concentrically positioned within, the outer capacitive coupling portion 80. The first or inner portion of the capacitive coupling is typically disposed radially inward relative to the second or outer portion of the capacitive coupling. It will be understood that the present subject matter includes capacitive coupling portions of a wide array of configurations and arrangements. And so, the capacitive coupling portions 80 and 90 need not be positioned relative to one another such that one is an inner coupling portion and the other is an outer coupling portion. The capacitive coupling portions 80, 90 are described in greater detail herein. The camera head 2 also comprises a second or rear inductive coupling portion 70 supported within the rear enclosure 220B. The rear inductive coupling portion 70 is electrically connected to the primary electronic assembly 230. As described herein, the rear inductive coupling portion 70 is spaced from, yet positioned adjacent to, the front inductive coupling portion 60. Typically, the first portion of the inductive coupling is disposed frontwardly relative to the second portion of the inductive coupling. It will be understood that the present subject matter includes inductive coupling portions of a wide array of configurations and arrangements. And so, the inductive coupling portions 60 and 70 need not be positioned relative to another such that one is a front coupling portion and the other is a rear coupling portion.

The camera head 2 also comprises a base plate 250 and a connector base 260 for supporting electrical communication between a push cable or push rod (not shown). The camera head 2 may additionally comprise one or more electrical connectors 270. The electrical connectors 270 are supported by the connector base 260 and provide convenient electrical connection to components of the camera head 2. The camera head 2 additionally comprises an LED assembly 200 for illuminating a frontwardly directed region of the camera head 2. One or more O-rings 210 or other sealing provisions can be utilized to support the LED assembly 200 along a frontwardly directed region or face of the enclosure 200.

Figure 5:
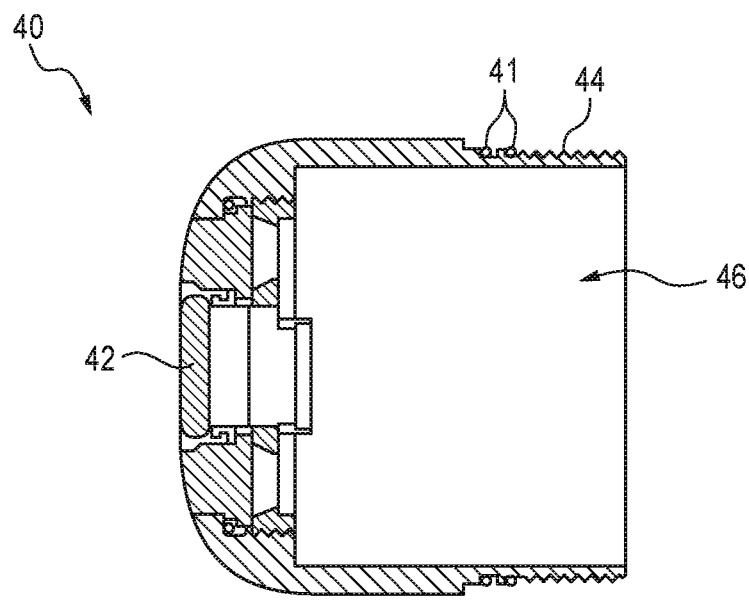
FIG. 5 is a schematic cross sectional view of a housing component of the camera head of FIG. 1.
Figure 6:
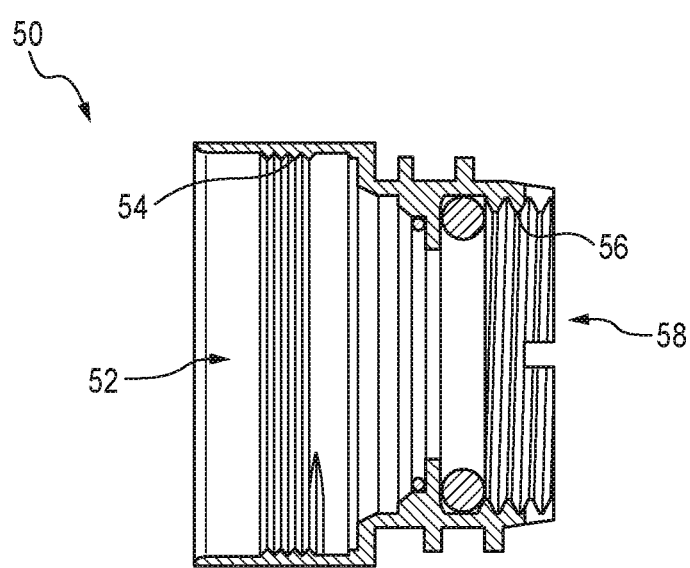
FIG. 6 is a schematic cross sectional view of another housing component of the camera head of FIG. 1.

FIGS. 5 and 6 illustrate in greater detail, the front housing 40 and the rear housing 50. The front housing 40 can include a protective optically transparent member 42 which can for example be a sapphire cover. As noted, the front and rear housings 40, 50 can be threadedly engaged with each other to define a generally hollow interior. The front housing 40 defines a threaded region 44 along an outer circumferential wall of the housing 40. The front housing 40 also defines a rearwardly directed open face 46 providing access to the interior of the front housing 40. The rear housing 50 defines a threaded region 54 along an inner circumferential wall of the housing 50. As will be understood, the threaded regions 44 and 54 threadedly engage each other to provide a sealing engagement between the housings 40, 50. The present subject matter includes the use of other sealing provisions in addition to, or instead of, the threaded regions 44, 54. For example, the present subject matter includes the use of one or more sealing O-rings such as O-rings 41 shown in FIG. 5. Additional nonlimiting examples of sealing provisions include gaskets, sealing compositions, adhesives, and combinations thereof. The rear housing 50 also defines a frontwardly directed open face 52 and a rearwardly directed open face 58, both providing access to the interior of the rear housing 50. In certain versions, the rear housing 50 may also include a threaded region 56 adjacent the rearwardly directed open face 58 for providing threaded engagement with another component.

Figure 7:
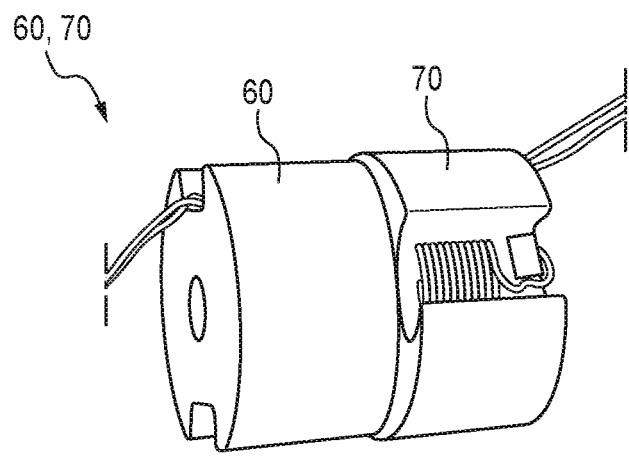
FIG. 7 is a perspective view of inductive coupling components used in the camera head of FIG. 1.

The front and rear inductive coupling portions or components 60, 70 respectively, assembled and shown in FIG. 7, are separated by an air gap and not directly in contact with each other. The inductive coupling 60, 70 provides for the wireless transfer of electrical power from the primary electronic assembly 230 to the rotating or positionable image sensor assembly 140. The inductive coupling 60, 70 functions by first producing a current in the rear coupling portion 70 attached to the primary electronic assembly 230. The input current, an AC current of any type of waveform, i.e. sinusoidal, square, triangular, or the like, is generated from DC power and provided through the push rod from the main power source. The electrical current, circulating through the conductive windings produces a magnetic field with amplitude and frequency proportional to those of the current. A ferromagnetic element, for example a pot core half, contains and directs the magnetic field from one half of the coupling to the other with minimal loss due to stray fields. The ferromagnetic element coupled with its conductive winding forms an inductor of sorts with the specific objective of creating a magnetic field that extends from the inductor in a well-defined manner. The front inductor portion 60 having a similar construction to the rear portion 70, receives the magnetic field and produces an electrical current as a result of the turns and provides another AC current as described. Because of the spacing between the front and rear inductor portions 60, 70 and associated magnetic field loss, the front inductor portion 60 has more turns in effect boosting the voltage to compensate for the losses.

Figure 8:
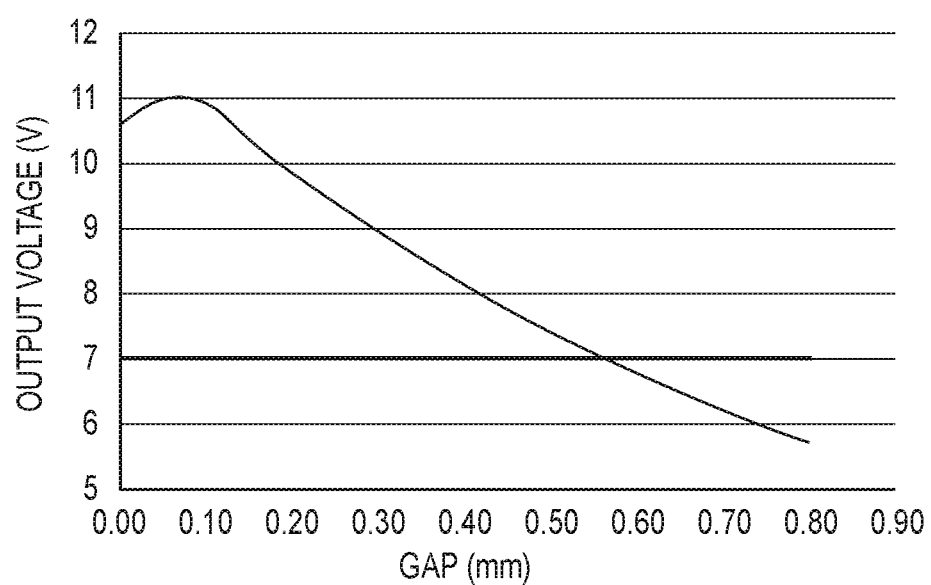
FIG. 8 is a graph of output voltage in the camera head as a function of a dimensional gap between inductors in the camera head.

A maximum axial gap width is determined per the requirements for the receiving circuit. As shown in FIG. 8, as the gap increases the voltage available decreases per a non-linear function which is a property of magnetic fields. FIG. 8 indicates that in this configuration, if for example the minimum generated voltage is 7 volts to ensure proper operation of the image sensing circuitry, the maximum gap that can be tolerated is 0.55 millimeters. The present subject matter is not limited to these voltages or distances. This gap is shown as gap X in FIGS. 1 and 10. Camera heads according to the present subject matter utilize linear gaps between the front and rear inductive coupling portions of from about 0.01 mm to 0.55 mm, more typically from 0.10 mm to 0.30 mm, and in certain versions a distance of 0.10 mm. These dimensions are the average distance between opposing faces of the front and rear inductive coupling portions, as measured along a line parallel to an axis of rotation of one of the arranged/assembled front and rear inductive coupling portions.

Upon the front inductor portion 60 receiving the field and producing the electrical current, the current is further rectified to a DC current, filtered, and regulated to provide the necessary power required for the image sensor assembly 140 and its associated circuitry.

Capacitive couplings generally function the same as inductive couplings by first providing power to a first capacitive coupling, creating an electrical field, and the electrical field being received by a second capacitive coupling. Capacitive couplings, however, are different from inductors in that they use voltage differences and electrical fields instead of current and magnetic fields. Therefore, controlling of the electrical field by a voltage difference produced by the image sensor assembly allows that signal to be propagated across the capacitive coupling. Specifically, high frequency transmission capacitive couplings work well as they are more adept than inductors. As a need to transmit video signals which can be as high as 6 MHz, a capacitive coupling will provide a suitable solution. However, the frequency of video signals associated with the camera heads of the present subject matter is not limited to 6 Mhz.

Figure 2:
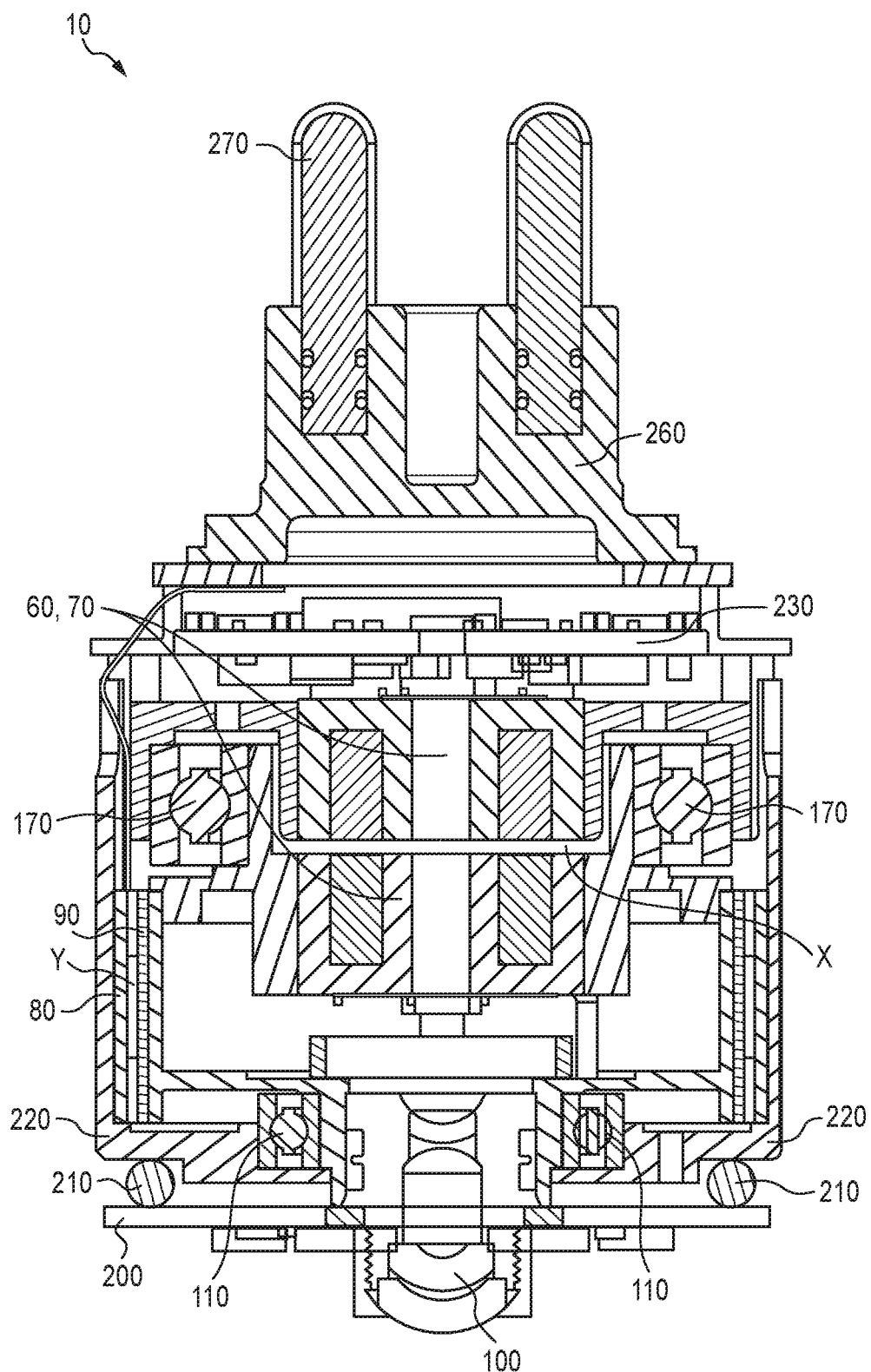
FIG. 2 is a schematic cross sectional view of a camera head module from FIG. 1.
Figure 9:
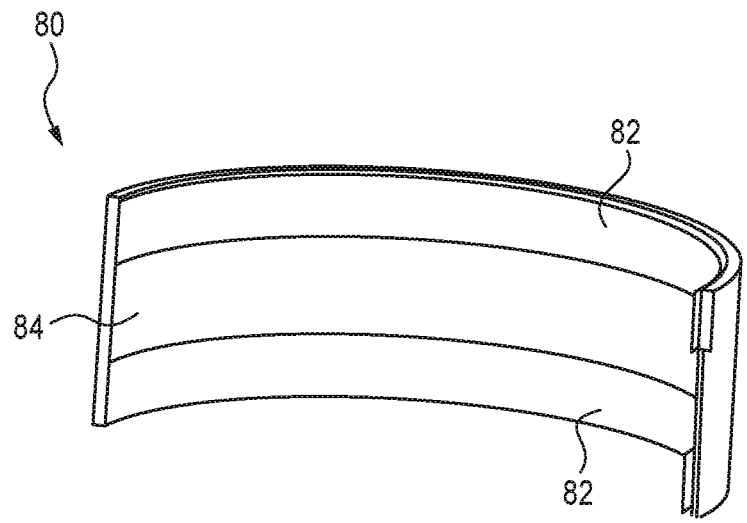
FIG. 9 is a perspective view of an outer capacitive coupling component used in the camera head of FIG. 1.
Figure 10:
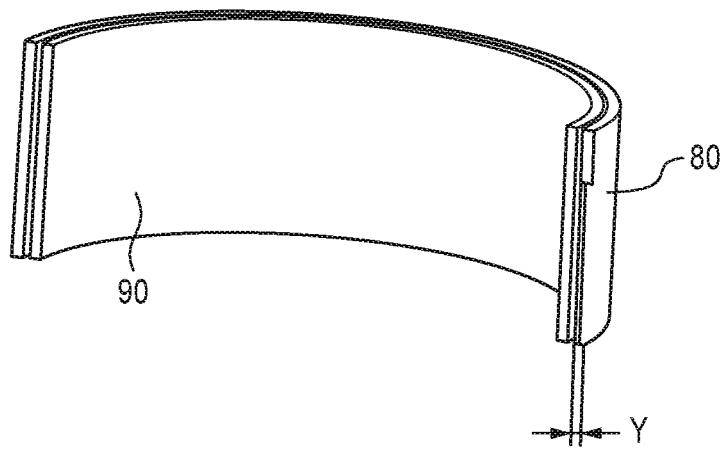
FIG. 10 is a perspective view of an assembly of capacitive coupling components used in the camera head of FIG. 1.

Referring to FIG. 9, the outer capacitive coupling portion 80 comprises two parallel regions 82 of copper or other conductive material, having a defined width and spacing 84 between the two regions as shown in FIG. 9. The outer capacitive coupling portion 80 is supported within the enclosure 220 and particularly, the front enclosure 220A. The outer capacitive coupling portion 80 is oriented within the enclosure 220 such that its regions 82 of conductive material are directed inwardly. The outer capacitive coupling portion 80 is electrically connected to the primary electronic assembly 230 as described in greater detail herein. An inner capacitive coupling portion 90, having a geometry and configuration very similar to the outer capacitive coupling portion 80, is attached to the inner housing 120 of the rotatable assembly 20 with its corresponding conductive strips or regions facing outwards and spaced at an appropriate radial gap Y from the outer capacitive coupling portion 80 as shown in FIGS. 2 and 10. Camera heads according to the present subject matter utilize radial gaps between the outer and inner capacitive couplings of from about 0.01 mm to 0.30 mm, more typically from 0.05 mm to 0.15 mm, and in certain versions a distance of 0.10 mm. These dimensions are the average distance between opposing faces of the outer and inner capacitive coupling portions, as measured radially from a center point of concentrically arranged/assembled outer and inner capacitive coupling portions. The inner coupling portion 90 is further electrically connected to the image sensor assembly 140. The inner coupling portion 90 allows transmission of the received signal from the image sensor assembly 140 to the outer capacitive coupling portion 80 which is further processed by the primary electronic assembly 230, and sent through a push rod to a receiving monitor or other operator interface. Both capacitive coupling portions 80, 90 are typically mounted with an adhesive, for example double-sided tape, glue, etc., to their respective housings.

It will be understood that the present subject matter is not limited to any of the representative embodiments of the capacitive couplings 80, 90 and/or the inductive couplings 60, 70 described herein and illustrated in the referenced figures. Instead, the present subject matter includes capacitive couplings and/or portions having different shapes, forms, configurations and/or gap dimensions than described herein. Similarly, the present subject matter includes inductive couplings and/or portions having different shapes, forms, configurations and/or gap dimensions than described herein.

Figure 11:
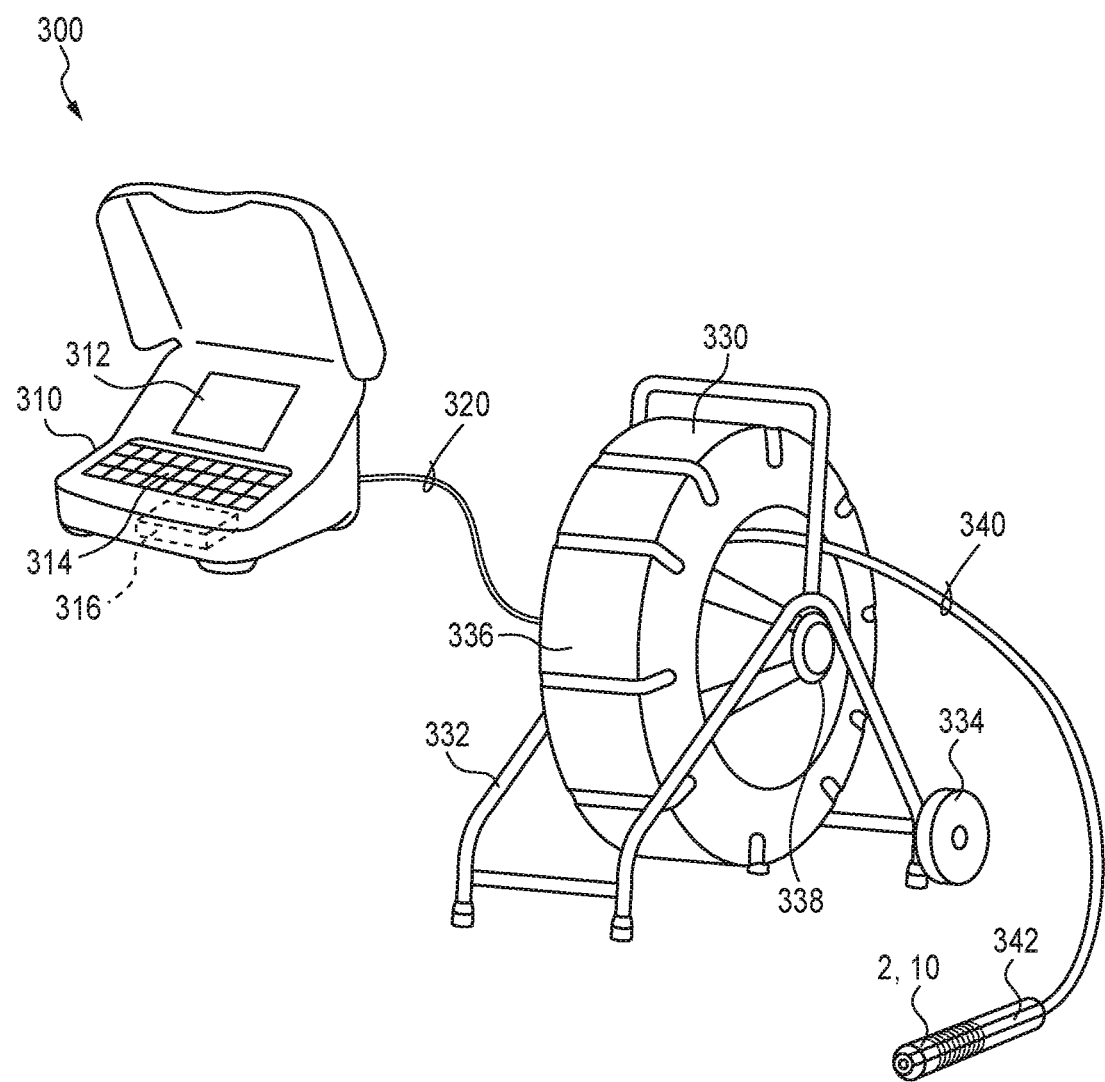
FIG. 11 is a schematic view of an inspection system using a camera head in accordance with the present subject matter.

The present subject matter also provides systems such as drain inspection systems utilizing the camera heads for example camera head 2 or camera head module 10 described herein. FIG. 11 schematically illustrates a system 300 comprising an operator interface 310 including a monitor or display 312, a keypad 314, and an optional battery 316 or other power source. The system 300 also comprises a reel assembly 330 that typically includes a rotatable drum 336 supported by a frame 332. As will be understood, the drum 336 retains and/or stores push cable. The reel assembly 330 can include one or more wheels 334 to facilitate transport of the drum and frame. The system 300 also comprises a push cable 340 which provides power and signal transmission to the camera head 2 typically releasably engaged to a distal end 342 of the push cable 340. As will be understood, the drum 336 is adapted to store the push cable 340 typically in a coiled or wound arrangement within the interior of the drum 336. The system 300 can additionally include a cord 320 for signal and/or power transmission to the operator interface 310. The present subject matter also includes systems using wireless signal communication between the operator interface 310 and the reel assembly 330 which may thereby avoid use of the cord 320. In such wireless configurations, electrical power is provided to the camera head from the reel assembly 330.

The self leveling camera heads of the present subject matter can be used with a wide array of inspection systems that are commercially available. Nonlimiting examples of monitors and recorders include those available under the RIDGID designation such as the RIDGID SeeSnake CS12 Monitor, CS65x Monitor, CS6x Monitor, and CS6xPak Monitor. Nonlimiting examples of reels include those available under the RIDGID designation such as a 200' Color Reel (NTSC) and a 325' Color Reel (NTSC). Push cables such as RIDGID SeeSnake Push Cable Assemblies can be utilized. Related ancillary accessories available under the RIDGID designation and SeeSnake line can be used.

The terms "front" and "rear" are periodically used herein in describing components or aspects of the present subject matter camera heads. These terms are used with regard to the camera head in which a front portion of the camera head is directed toward an area of inspection upon advancement of the camera head, and a rear portion of the camera head is oppositely directed from the front portion. Typically, light is emitted from the front portion of the camera head and engagement with the push cable is made at the rear of the camera head.

The present subject matter provides numerous benefits including improved reliability since there are no slip rings, no wear in slip rings, and improved manufacturability. In addition, capacitive and inductive coupling are more tolerant to slight alignment errors than slip rings.

The present subject matter includes alternate embodiments including digital rotation of the image through video processing with digital-analog conversion in the camera head and a multi-axis accelerometer to determine the relative direction of gravity.

The present subject matter also includes the camera heads used with a fully digital video system with an accelerometer to provide information about the orientation of the gravity vector. Digital video processing can occur either in the camera head or in the receiving unit, for example using a push rod reel or monitor.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A camera head comprising:
    a housing;
    an image sensor assembly disposed in the housing;
    a first portion of a capacitive coupling electrically connected to the image sensor assembly;
    a second portion of a capacitive coupling in wireless signal communication with the first portion of the capacitive coupling;
    a first portion of an inductive coupling electrically connected to the image sensor assembly;
    a second portion of an inductive coupling in wireless power transmission with the first portion of the inductive coupling;
    wherein the camera head is free of slip rings.

2. The camera head of claim 1 further comprising:
    a bearing assembly having a first bearing member secured to the housing and a second bearing member positionable with respect to the first bearing member;
    a weighted support secured to the image sensor assembly, the weighted support also secured to the second bearing member of the bearing assembly, wherein the weighted support provides gravity determined positioning of the image sensor assembly.

3. The camera head of claim 1 further comprising:
    a primary electronic assembly electrically connected to the second portion of the capacitive coupling.

4. The camera head of claim 3 wherein the primary electronic assembly is also electrically connected to the second portion of the inductive coupling.

5. The camera head of claim 1 further comprising:
    an LED assembly supported by the housing, the LED assembly for emitting light from the camera head.

6. The camera head of claim 1 further comprising:
    an optical lens assembly coupled to the image sensor assembly.

7. The camera head of claim 1 wherein the first portion of the capacitive coupling is disposed radially inward relative to the second portion of the capacitive coupling.

8. The camera head of claim 1 wherein the first portion of the inductive coupling is disposed frontwardly relative to the second portion of the inductive coupling.

9. A self leveling camera head comprising:
    an enclosure defining a hollow interior;
    a rear portion of an inductive coupling supported by the enclosure;
    an outer portion of a capacitive coupling supported by the enclosure;
    a primary electronic assembly supported by the enclosure;
    a rotatable assembly disposed in the hollow interior of the enclosure, the rotatable assembly including an inner portion of the capacitive coupling, an image sensor assembly, and a front portion of an inductive coupling;
    wherein the outer portion of the capacitive coupling and the inner portion of the capacitive coupling are in wireless signal communication with each other, and the front portion of the inductive coupling and the rear portion of the inductive coupling are in wireless power transmission with each other;
    wherein the camera head is free of slip rings.

10. The self leveling camera head of claim 9 wherein the primary electronic assembly is in electrical communication with the outer portion of the capacitive coupling.

11. The self leveling camera head of claim 10 wherein the primary electronic assembly is also in electrical communication with the rear portion of the inductive coupling.

12. The self leveling camera head of claim 9 wherein the image sensor assembly is in electrical communication with the inner portion of the capacitive coupling.

13. The self leveling camera head of claim 12 wherein the image sensor is also in electrical communication with the front portion of the inductive coupling.

14. The self leveling camera head of claim 9 wherein the rotatable assembly further includes a weighted support secured to the image sensor assembly, the weighted support providing gravity determined positioning of the image sensor assembly.

15. The self leveling camera head of claim 9 further comprising:
an LED assembly for emitting light from the camera head.

16. The self leveling camera head of claim 9 further comprising:
an optical lens assembly for directing light to the image sensor assembly.

17. An inspection system comprising:
an operator interface;
a reel assembly including a rotatable drum;
a camera head;
a push cable extending between the reel assembly and the camera head;
wherein the camera head includes (i) a housing, (ii) an image sensor assembly disposed in the housing, (iii) an inner portion of a capacitive coupling electrically connected to the image sensor assembly, (iv) an outer portion of a capacitive coupling in wireless signal communication with the inner portion of the capacitive coupling, (v) a front portion of an inductive coupling electrically connected to the image sensor assembly, and (vi) a rear portion of an inductive coupling in wireless power transmission with the front portion of the inductive coupling, wherein the camera head is free of slip rings.

18. The inspection system of claim 17 wherein the camera head further includes a bearing assembly having a first bearing member secured to the housing and a second bearing member positionable with respect to the first bearing member, the camera head further including a weighted support secured to the image sensor assembly, the weighted support also secured to the second bearing member of the bearing assembly, wherein the weighted support provides gravity determined positioning of the image sensor assembly.

19. The inspection system of claim 17 wherein the camera head further includes a primary electronic assembly electrically connected to the outer portion of the capacitive coupling.

20. The inspection system of claim 19 wherein the primary electronic assembly is also electrically connected to the rear portion of the inductive coupling.

21. The inspection system of claim 17 wherein the camera head further includes an LED assembly supported by the housing, the LED assembly for emitting light from the camera head.

22. The inspection system of claim 17 wherein the camera head further includes an optical lens assembly coupled to the image sensor assembly.

* * * * *